(12) United States Patent
Taffin et al.

(10) Patent No.: US 6,459,977 B1
(45) Date of Patent: Oct. 1, 2002

(54) METHOD FOR CONTROLLING AN AUTOMATIC TRANSMISSION GEAR RATIO SHIFTS

(75) Inventors: Christian Taffin, Chatou (FR); Robert Mestres, Saint Sambre (FR)

(73) Assignees: Renault, Boulogne (FR); Automobiles Peugeot, Paris (FR); Automobiles Citroen, Neuilly (FR)

( * ) Notice: Subject to any disclaimer, the term of this patent is extended or adjusted under 35 U.S.C. 154(b) by 0 days.

(21) Appl. No.: 09/463,955
(22) PCT Filed: Jun. 26, 1998
(86) PCT No.: PCT/FR98/01361
§ 371 (c)(1), (2), (4) Date: Feb. 9, 2000
(87) PCT Pub. No.: WO99/01685
PCT Pub. Date: Jan. 14, 1999

(30) Foreign Application Priority Data

Jul. 2, 1997 (FR) .............................................. 97 08324

(51) Int. Cl.[7] ................................................. G06F 7/00
(52) U.S. Cl. ........................................... 701/51; 701/66
(58) Field of Search ............................. 701/51, 52, 57, 701/62, 64, 66; 477/34

(56) References Cited

U.S. PATENT DOCUMENTS

| 5,335,743 A | * | 8/1994 | Gillbrand et al. ........... 180/178 |
| 5,673,668 A | * | 10/1997 | Pallett et al. ................ 123/436 |
| RE36,186 E | * | 4/1999 | White et al. ................. 477/108 |
| 6,360,155 B1 | * | 3/2002 | Taffin et al. .................. 701/57 |

* cited by examiner

Primary Examiner—Yonel Beaulieu
(74) Attorney, Agent, or Firm—Oblon, Spivak, McClelland, Maier & Neustadt, P.C.

(57) ABSTRACT

A method for blocking and releasing gear ratios in a vehicle equipped with an automatic gear box. The process includes combined functions F1, F2, F3 in which F1 is a function for blocking a passage of a transmission ratio during a first time delay, F2 is a function for blocking passage of a ratio in response to an instability of a fuel throttle opening angle, and F3 is a function for blocking passage of a ratio in response to a deceleration of the vehicle.

10 Claims, 3 Drawing Sheets

METHOD FOR CONTROLLING AN AUTOMATIC TRANSMISSION GEAR RATIO SHIFTS

The present invention relates to motor-vehicle automatic transmissions with multi-stage gear ratios. More precisely, it relates to a fuzzy-logic process for control of gear ratios by disabling and enabling, which process permits improvement of vehicle driving comfort and safety, regardless of the driving or traveling conditions encountered (uphill, downhill or level).

DISCUSSION OF THE BACKGROUND

In most currently used methods for control of gear ratio changes in automatic mode, the gear ratio changes are actually authorized as a function of vehicle speed and engine load. Most often, these speed and load criteria are translated in the form of gear ratio change laws, which are conveniently visualized in a graph having coordinates of $V_{veh}/\alpha_{pap}$, where $V_{veh}$ denotes the vehicle speed and $\alpha_{pap}$ the gas throttle opening angle, or more generally the percentage opening of the device for regulation of admission of fuel to the engine.

An example of a commonly used gear ratio shift law is proposed in FIG. 1, in which curve 1 represents the downshift curve (or in other words a decrease from ratio N to ratio N−1, abbreviated as N/N−1), and curve 2 represents the upshift curve (abbreviated N/N+1), where N is the current gear ratio of the automatic transmission. These shift laws are defined such that the vehicle speeds at which gear ratio changes take place slide to higher values as the engine load becomes greater.

Moreover, for a given engine load, or more exactly for a given opening $\alpha_{pap}$, on the other hand, the N−1/N shift, or in other words the shift from a lower gear ratio to the next higher gear ratio, also takes place without exception at a speed substantially higher than that at which there occurs the corresponding inverse N/N−1 shift, or downshift. This provision, which can be regarded as a hysteresis effect, has the purpose of avoiding an unacceptable hunting tendency between the N−1 and N gear ratios which would inevitably occur if the upshifts and downshifts were to take place under the same speed and load condition.

Taking as example a vehicle in acceleration while in gear ratio N with a substantially constant accelerator position $\alpha_{pap}$, this phase is represented by the segment of FIG. 1 oriented along OA. It is now supposed that the driver is forced suddenly to raise his foot from the accelerator at point A. This maneuver is reflected on the same FIG. 1 by the line segment AB, which is substantially vertically oriented if the release of the accelerator is sufficiently rapid that the vehicle speed does not have time to decrease. Segment AB will intersect curve 2 at point C on FIG. 1, and the transmission then decides to shift automatically to the higher gear ratio N+1. In most cases this gear ratio change is entirely premature, and is not desired by the driver, since the engine brake of the vehicle is reduced by the shift to ratio N+1, while the driver has explicitly shown his intention to slow down by rapidly lifting his foot. As a result, this gear ratio change detracts from driving comfort, causes a feeling of not having any engine brake, and can sometimes distract the driver, thus having an influence on safety.

A satisfactory solution has nevertheless already been proposed and described in French Patent Application FR 83-07277 of May 2, 1983. It comprises associating with the gear ratio upshift and downshift curves two other curves: a negative acceleration curve and an increasing opening curve.

Thus, according to this known method, the shift to higher gear ratio is authorized only if the opening value $\alpha_{pap}$ is stabilized. The gear ratio is disabled when the operating point in the graph of $\alpha_{pap}$ versus speed is below the negative acceleration curve. It is then enabled when the operating point passes above the increasing opening curve (situated slightly above the negative acceleration curve).

SUMMARY OF THE INVENTION

This known method has several disadvantages, including the following in particular:

firstly, it is suitable only if the vehicle is not loaded and is running on the level. In fact, the negative acceleration curve is defined for these specific traveling conditions;

furthermore, it necessitates numerous calibration parameters (about 60), thus making its use difficult;

in addition, the hysteresis between the negative acceleration and increasing opening curves must remain slight to ensure that the principle can operate, but it generates gear ratio enablings which take place too soon from the viewpoint of driving pleasure;

finally, this method cannot be adapted to the driver's driving style.

The object of the invention is therefore to provide a process for disabling and enabling ratios of the gearbox of a vehicle equipped with an automatic transmission with multi-stage gear ratios, which process permits disabling the gear ratio of the transmission (and also enabling this same ratio) effectively, regardless of the traveling conditions. Another object of the invention is to overcome the practical problems inherent in the method described in the said French Patent Application 83-07277.

To this end, the invention relates to a process for disabling and enabling gear ratios of a vehicle equipped with an automatic gearbox, characterized in that it is provided with a combination of functions (F1, F2, F3) comprising:

F1: disabling the shift of a transmission gear ratio during a first time delay, referred to as waiting time delay ($T_a$);

F2: disabling the shift of a gear ratio in response to instability of the fuel-supply throttle opening angle ($\alpha_{pap}$)

F3: disabling the shift of a gear ratio in response to vehicle deceleration.

More precisely, the process according to the invention is provided with the stages comprising:

a) at the intersection with a curve of shift to higher gear ratio from N to (N+1), starting a first time delay known as waiting time delay $T_a$ during which the higher gear ratio (N+1) is disabled;

b) during this time delay $T_a$, performing a fuzzy logic analysis of the stability of the foot; (this comprises determining a variable, referred to as UP-DEL-GRD, representative of the stability of opening of the device for regulation of admission of fuel to the engine. If this parameter is judged to be stable, then the higher gear ratio will be authorized, at the end of time delay $T_a$, provided the deceleration of the vehicle is not negative, in which case F3 would then be activated. In the opposite case (if the driver raises his foot rapidly, for example), a second time delay $T_{unstable}$ is started, during which the higher gear ratio is still disabled. This time delay $T_{unstable}$ may depend on the rate of change of $\alpha_{pap}$ while the foot is being raised, or else on a factor representative of the sportiness of the driving of the driver. A procedure for reinitialization and disabling of this second time delay $T_{unstable}$ is also defined.

c) During this time delay $T_{unstable}$, observation of the vehicle deceleration is performed. It is also achieved in fuzzy logic from the signals $\alpha_{pap}$ (opening of the engine throttle) and $\gamma_{veh}$, which is the real acceleration of the vehicle calculated from the vehicle speed $V_{veh}$ by differentiation and filtering. The deceleration condition of the vehicle is identified by determination of a representative variable called UP-DEL-AC. When the vehicle is in deceleration phase, a phase of disabling of the higher gear ratio known as "deceleration" is entered, which phase can be relatively long and which can be assimilated with the concept of "negative acceleration curve", but which is constructed from the real acceleration $\gamma_{veh}$ of the vehicle, thus ensuring good operation for all traveling situations (uphill, downhill or level).

Otherwise, if the vehicle does not enter the deceleration phase (the vehicle continues to accelerate), the higher gear ratio will be authorized at the end of time delay $T_{unstable}$.

d) Once the vehicle has entered the deceleration phase, the vehicle deceleration condition is continually observed. The gear ratio remains disabled as long as the vehicle acceleration remains negative. As soon as the vehicle acceleration is judged sufficient (at a certain predetermined level), the distance traveled by the vehicle is calculated from the vehicle speed. Enabling of the gear ratio is then authorized either:

when the vehicle has traveled a certain distance with $\alpha_{pap}$ having remained stable, or.

when the engine rpm becomes too high, or when the downshift curve N/N−1 is intersected.

Exit from disabling after a certain distance has been traveled has the advantage of not enabling the ratio too rapidly, which was a shortcoming of the method described in French Patent Application FR 83-07277. In fact, when the driver while moving at moderate speed, for example in third gear, rapidly raises the accelerator upon entering a curve, this gear ratio will be disabled. The present invention will ensure that this same gear ratio will remain: disabled for a good portion of the curve, corresponding to the time that the vehicle could travel a certain distance, in contrast to the method of French Patent Application FR 83-07277, which allows enabling as soon as the decreasing opening curve is intersected.

The invention also relates to a transmission and to a motor vehicle using the process having the above characteristics for disabling and enabling gear ratios.

BRIEF DESCRIPTION OF THE DRAWINGS

The invention will be better understood and other advantages of the invention will become clear upon reading the description hereinafter, given by way of nonlimitative example, and of the attached drawings, wherein.

DESCRIPTION OF THE PREFERRED EMBODIMENTS

Figure 2:
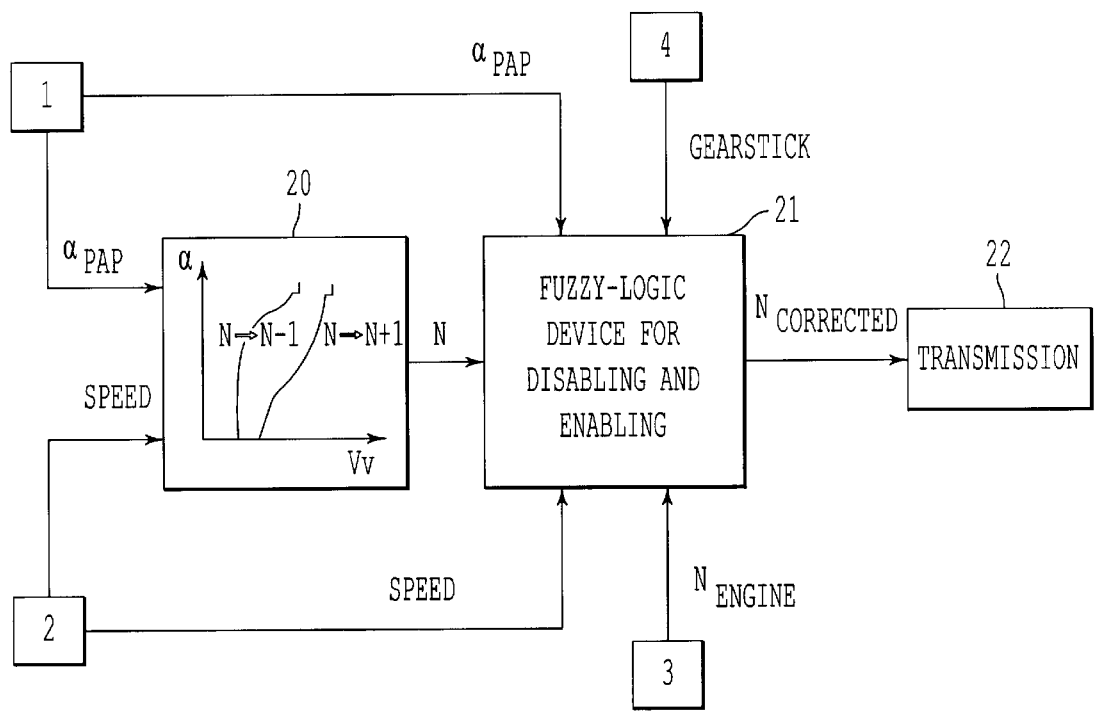
FIG. 2 represents a partial schematic view of a motor vehicle using the fuzzy-logic process according to the invention of disabling and enabling of gear ratios.

Referring now to FIG. 2, functional block 20 uses a cartographic method as in the graph of αpap versus "speed" to determine, from the opening-angle signal $\alpha_{pap}$ transmitted from sensor 1 associated with the engine and from the vehicle "speed" signal transmitted from sensor 2 associated with the vehicle, the gear ratio N to be applied to the automatic transmission, which is represented schematically by block 22. Fuzzy-logic device 21 for disabling and enabling permits the ratio N to be disabled or not, and does so by correcting for additional signals: gearstick position and engine rpm, transmitted respectively by sensors 4 and 3. This same device 21 constructs a proposal for corrected gear ratio N which takes into account the disabling or enabling conditions, after which the corrected gear ratio signal N is effectively applied to the transmission 22.

According to one of the characteristics of the present invention, the fuzzy-logic device for disabling and enabling the gear ratios is provided with the following three separate functions in combination:

function F1: disabling by waiting time delay function F2: disabling in response to an instability of the angle $\alpha_{pap}$ of opening of the throttle function F3: disabling in response to vehicle deceleration or total lifting of the foot.

According to another characteristic of the present invention, function F3 has priority over functions F2 and F1, and function F2 has priority over function F1.

Function F1 comprises inhibiting, when the following conditions exist simultaneously: F2 and F3 not activated, and higher gear ratio is demanded by the shift laws, the higher gear ratio (the gear ratio is disabled) for a time delay $T_a$. Exit from function F1 can take place:

if one of the functions F2 or F3 becomes active, or if the demand for higher gear ratio by the laws disappears, or if time delay $T_a$ has ended.

The purpose of this function F1 is to delay the higher gear ratio slightly at the intersection with the curve of upshift from N to N+1, in such a way that the conditions of entry into functions F2 and F3 can be analyzed satisfactorily, since the functions F2 and F3 tend to lead to disabling situations of longer duration.

Function F2 comprises inhibiting the higher gear ratio (the gear ratio is disabled) for a second time delay $T_{unstable}$ when the following conditions exist simultaneously:

F3 not active, and the higher gear ratio is demanded by the change laws, and

Figure 3:
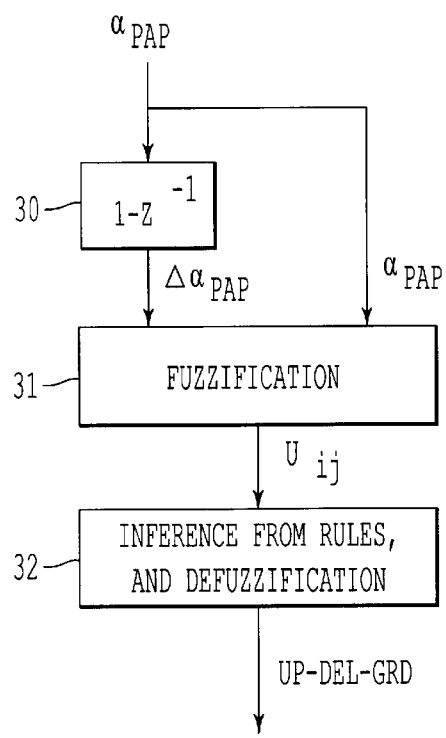
FIG. 3 represents the fuzzy-logic principle of determination of the characteristic value of the instability of opening of the throttle.

UP-DEL-GRD (representing the stability)>threshold-GRD-high;

The value UP-DEL-GRD is a characteristic variable representative of the stability of opening $\alpha_{pap}$ of the device for regulation of admission of fuel to the engine. This variable is determined by a fuzzy logic method from the signal $\alpha_{pap}$ transmitted by throttle opening sensor 1, and in accordance with the execution scheme illustrated in FIG. 3. According to this scheme, block 30 determines the throttle angle variation $\Delta\alpha_{pap}$ by simple differentiation $$\Delta\alpha_{pap}=\alpha_{pap}(t)-\alpha_{pap}(t-T_e)$$

where t is the current sampling instant and $T_e$ is the sampling period. Block 31 performs fuzzification of the variables $\Delta\alpha_{pap}$ and $\alpha_{pap}$ in accordance with fuzzy groups defined in the fuzzy rules of operation of function F2. From this block 31 there are deduced the respective degrees of membership αpap and of $\Delta\alpha_{pap}$, abbreviated $\mu_{ij}$, to the fuzzy subgroups, which degrees are supplied to the set of rules included in block 32. The function of block 32 is to calculate the variable UP-DEL-GRD, which is representative of the stability of the throttle position, classically by inference from fuzzy rules and fuzzifications. As an example, the fuzzy rules embodied in block 32 could be:

R1: if $\Delta\alpha_{pap}$ is negative and $\alpha_{pap}$ is moderate, then UP-DEL-GRD is large.

R2: is $\Delta\alpha_{pap}$ is very negative and αpap is large, then UP-DEL-GRD is large, corresponding to great stability.

R3: if $\Delta\alpha_{pap}$ is positive, then UP-DEL-GRD is moderate, unless UP-DEL-GRD is small.

Consequently, depending on whether the foot is stable or not, UP-DEL-GRD will have more or less large values. Such rules allow the stability of opening of the gases to be controlled differently at low/moderate loads and at high loads, because a driver tends to raise the accelerator foot more rapidly at high loads as compared with at low loads.

Figure 1:
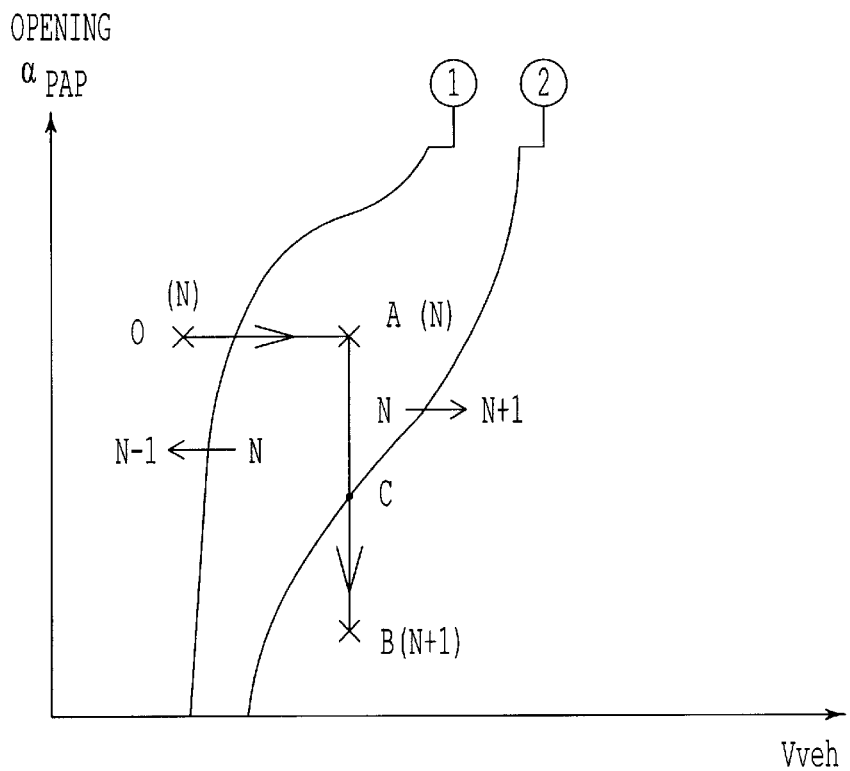
FIG. 1 represents, in a graph of the angle $\alpha_{pap}$ of opening of the gas throttle as a function of the vehicle speed $V_{veh}$, a cycle characteristic of the problem of disabling of the gear ratio while the foot is being raised.
Figure 4:
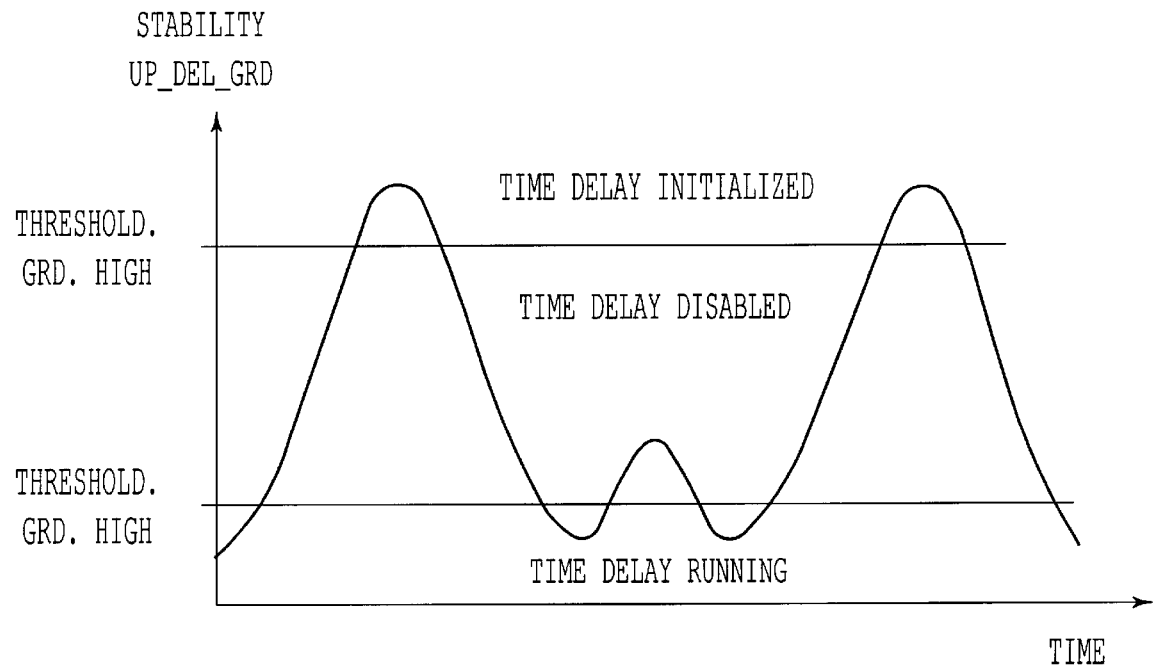
FIG. 4 represents the principle of initialization, maintenance and decrementation of the time delay $T_{unstable}$.

Thus, when the variable UP-DEL-GRD representative of the stability of the throttle angle is higher than a threshold abbreviated as threshold-GRD-high (see FIG. 4), and if other conditions are satisfied, the higher gear ratio is disabled and a time delay $T_{unstable}$ is started. As shown by the scheme illustrated in FIG. 4, this time delay is reinitialized, disabled or running depending on the stability values assumed by UP-DEL-GRD.

When the stability variable UP-DEL-GRD is higher than the "threshold-GRD-high" threshold, the time delay is initialized at a value which depends on the variation $\Delta\alpha_{pap}$ of throttle opening and possibly of an indicator of the driving sportiness of the driver.

When the stability UP-DEL-GRD is between the limits threshold-GRD-low and threshold-GRD-high, the time delay is disabled.

When the stability UP-DEL-GRD is lower than or equal to threshold-GRD-low, the time delay is running. This concept of hysteresis and reinitialization ensures that the gear ratio will remain well disabled as long as αpapremains unstable, and that disabling will be vigorous relative to possible measurement noise on the signal $\alpha_{pap}$.

Exit from function F2 for inhibition of the higher gear ratio can take place if function F3 becomes active (disabling for deceleration), or if the demand for higher gear ratio by the shift laws disappears, or if time delay $T_{unstable}$ has elapsed, or if the driver actuates the gearstick for the purpose of obtaining a higher gear ratio, or if $N_{engine} \geq$ threshold-$N_{engine}$-high (engine overspeed)

Thus the purpose of this function F2 is to disable the higher gear ratio as long as the throttle angle remains unstable, for the purpose of improving the quality of upshifts and of achieving entry, if applicable, into the described long-duration disabling phase achieved by function F3. This latter function comprises inhibiting the higher gear ratio (the gear ratio is disabled) when the following conditions exist simultaneously:

the upshift ratio is demanded by the laws,

UP-DEL-AC>threshold-AC-high (deceleration above a threshold), $N_{engine}<$threshold-$N_{engine}$-high.

Figure 5:
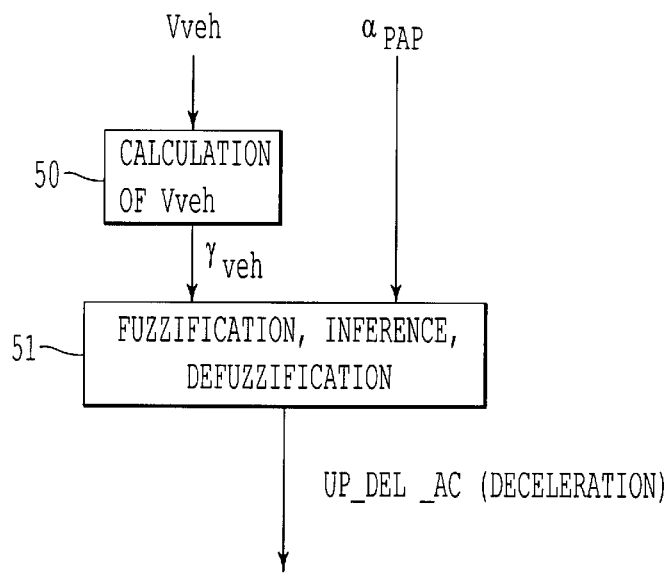
FIG. 5 represents the fuzzy-logic principle of determination of the characteristic value of the state of deceleration of the vehicle.

The value UP-DEL-AC is a characteristic variable representative of the state of deceleration of the vehicle. It is determined by the fuzzy logic method from the signal $\gamma_{veh}$ (deceleration or acceleration of the vehicle, depending on sign) and the signal $\alpha_{pap}$, the throttle angle transmitted by sensor 1. The vehicle acceleration is calculated from the vehicle speed $V_{veh}$ by classical first-order differentiation and digital filtering. FIG. 5 shows explicitly how the deceleration condition UP-DEL-AC is determined. Functional block 50 determines the acceleration $\gamma_{veh}$ by differentiation and filtering. Block 51 determines the variable UP-DEL-AC characteristic of the state of deceleration of the vehicle, by fuzzy logic (fuzzification, inference from rules and defuzzification). As an example, the fuzzy rules embodied in block 51 could be:

R1: if $\gamma_{veh}$ is negative or $\alpha_{pap}$ is small, then UP-DEL-AC is large.

R2: if $\gamma_{veh}$ is positive and $\alpha_{pap}$ is moderately large, then UP-DEL-AC is small.

When the vehicle deceleration becomes negative or when the driver significantly releases the accelerator, UP-DEL-AC assumes large values, indicating the intention to disable the higher gear ratios.

Figure 6:
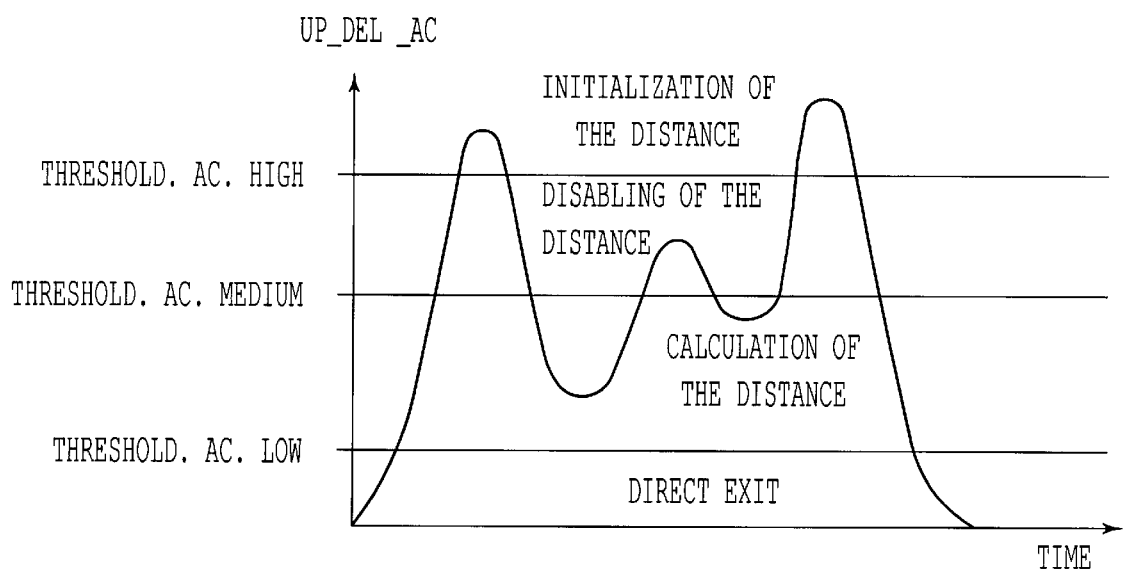
FIG. 6 represents the principle of initialization, maintenance and incrementation of the distance which allows exit from the disabling situation known as deceleration.

Thus, as shown in FIG. 6, when the variable UP-DEL-AC becomes higher than a threshold (UP-DEL-AC>threshold-AC-high), the decision to enter the disabling phase known as deceleration is made. Exit from the function F3 can take place if: $N_{engine} \geq$ threshold-$N_{engine}$-high (engine overspeed), or if the vehicle has traveled a certain parametrable distance d, or if the driver manually actuates the gearstick to obtain a higher gear ratio, or if the curve of downshift from N to N−1 is intersected.

Thus exit from this function F3 takes place mainly after a certain distance has been traveled, this distance being calculated by integration of the vehicle speed $V_{veh}$. This distance is reinitialized, disabled or running depending on the state of deceleration of the vehicle, as shown in FIG. 6.

When UP-DEL-AC>threshold-AC-high, then the distance is reinitialized to zero.

When threshold-AC-moderate<UP-DEL-AC≦threshold-AC-high, the distance is disabled at its value or UP-DEL-GRD>threshold-GRD-low.

When UP-DEL-AC<threshold-AC-moderate, the distance is calculated. When it reaches a certain value, which can depend on the corrected gear, ratio N and possibly on the sportiness character of the driver, exit from F3 takes Place and the higher gear ratio is authorized.

These phases of initialization, maintenance and incrementation of the distance at the end of which the higher gear ratio is engaged make it possible correctly to exit from the situation of disabling of the gear ratio, or in other words without premature exit while still being vigorous with respect to measuring noise on the vehicle speed signal.

According to another characteristic of the present invention, it is very easy to enhance the overall performances of disabling and enabling of the gear ratio, for example by taking into account an additional signal characteristic of the transverse acceleration ye of the vehicle. It would then be sufficient to supplement the base of fuzzy rules of the function F3 by the appropriate rules:

R3: if $\gamma_t$ is moderate, then UP-DEL-AC is moderate.

R4: if $\gamma_t$ is large, then UP-DEL-AC is large, etc.

What is claimed is:

1. A method for controlling a vehicle equipped with an automatic transmission gearbox comprising the steps of:
   - (F1) blocking a shift of a transmission gear ratio during a first time delay, wherein the first time delay being a waiting time delay ($T_a$);
   - (F2) determining when an instability of a fuel-supply throttle opening angle, $\alpha_{pap}$, exists and blocking the shift of the transmission gear ratio when it is determined in said determining step that $\alpha_{pap}$ is unstable; and
   - (F3) blocking the shift of the transmission gear ratio in response to vehicle deceleration.

2. A method according to claim 1, further comprising steps of:
   - a) starting the waiting time delay $T_a$ when an intersection occurs between $\alpha_{pap}$ and an upshift curve for shifting to a higher gear ratio (N/N+1), and blocking an upshift to the higher gear ratio during the waiting time delay $T_a$;
   - b) performing a stability analysis of an opening of a device for regulation of admission of fuel to an engine during the waiting time delay $T_a$;
   - c) releasing the upshift if the opening is judged to be stable at an end of the waiting time delay $T_a$, otherwise starting a second time delay $T_{unstable}$, during which the upshift remains blocked; and
   - d) determining a real acceleration, $\gamma_{veh}$, of the vehicle and entering a phase of blocking the upshift, during the second time delay $T_{unstable}$, when the vehicle is in a deceleration phase, otherwise upshifting at an end of the second time delay $T_{unstable}$.

3. A method according to claim 2, wherein the stability analysis and the real acceleration ($\gamma_{veh}$) of the vehicle are performed in a fuzzy logic mechanism.

4. A method according to claim 2, wherein the second time delay $T_{unstable}$ depends on at least one of a rate of opening, $\Delta\alpha_{pap}$, of the device for regulation of admission of fuel to the engine when a driver's foot is raised from an accelerator pedal, and on a factor representative of a driving style of the driver.

5. A method according to claim 2, wherein when the vehicle has entered the deceleration phase, a current gear ratio remains blocked as long as vehicle acceleration remains negative and below a predetermined threshold.

6. A method according to claim 2, further comprising steps of: releasing a shift to a lower gear ratio and calculating a distance traveled by the vehicle, when vehicle deceleration reaches a predetermined level, when at least one of a predetermined set of conditions exists, said predetermined set of conditions including,
   - the vehicle has traveled a predetermined distance with the $\alpha_{pap}$ having remained stable;
   - a rpm of the engine becomes higher than a predetermined rpm level; and
   - an intersection occurs between a value of $\alpha_{pap}$ and a downshift curve N/N−1.

7. A method according to claim 2, wherein the step F3 has priority over the step F2, and the step F2 has priority over the step F1.

8. A method according to claim 2, wherein the step F3 takes into account a value representative of a transverse acceleration, $\gamma_t$, of the vehicle.

9. An automatic transmission with multi-stage gear ratios, for a motor vehicle, said automatic transmission comprising:
   - means for blocking a shift of a transmission gear ratio during a first time delay, wherein the first time delay being a waiting time delay ($T_a$);
   - means for determining when an instability of a fuel-supply throttle opening angle, $\alpha_{pap}$, exists and blocking the shift of the transmission gear ratio when it is determined in said determining step that $\alpha_{pap}$ is unstable; and
   - means for blocking the shift of the transmission gear ratio in response to vehicle deceleration.

10. A motor vehicle having an automatic transmission with multi-stage gear ratios comprising:
   - means for blocking a shift of a transmission gear ratio during a first time delay, wherein the first time delay being a waiting time delay ($T_a$);
   - means for determining when an instability of a fuel-supply throttle opening angle, $\alpha_{pap}$, exists and blocking the shift of the transmission gear ratio when it is determined in said determining step that $\alpha_{pap}$ is unstable; and
   - means for blocking the shift of the transmission gear ratio in response to vehicle deceleration.

* * * * *